Jan. 2, 1968 R. E. GAYLE 3,361,215
MAGNETIC DRIVING APPARATUS FOR ELECTRIC FISHING MOTORS
Filed Oct. 17, 1966
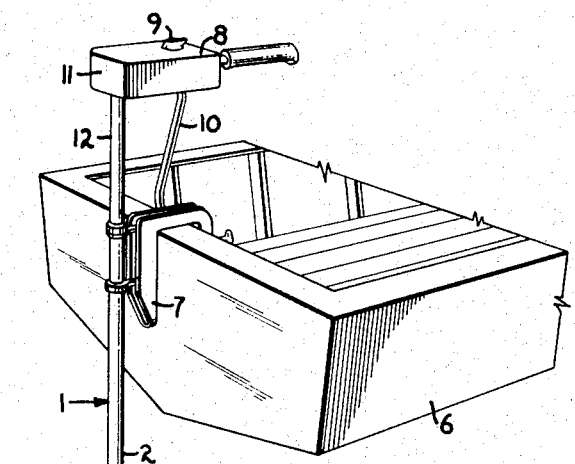
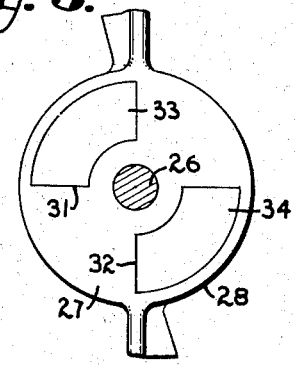
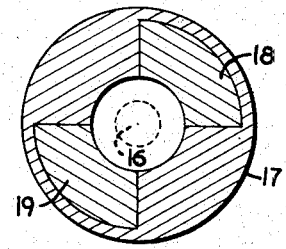
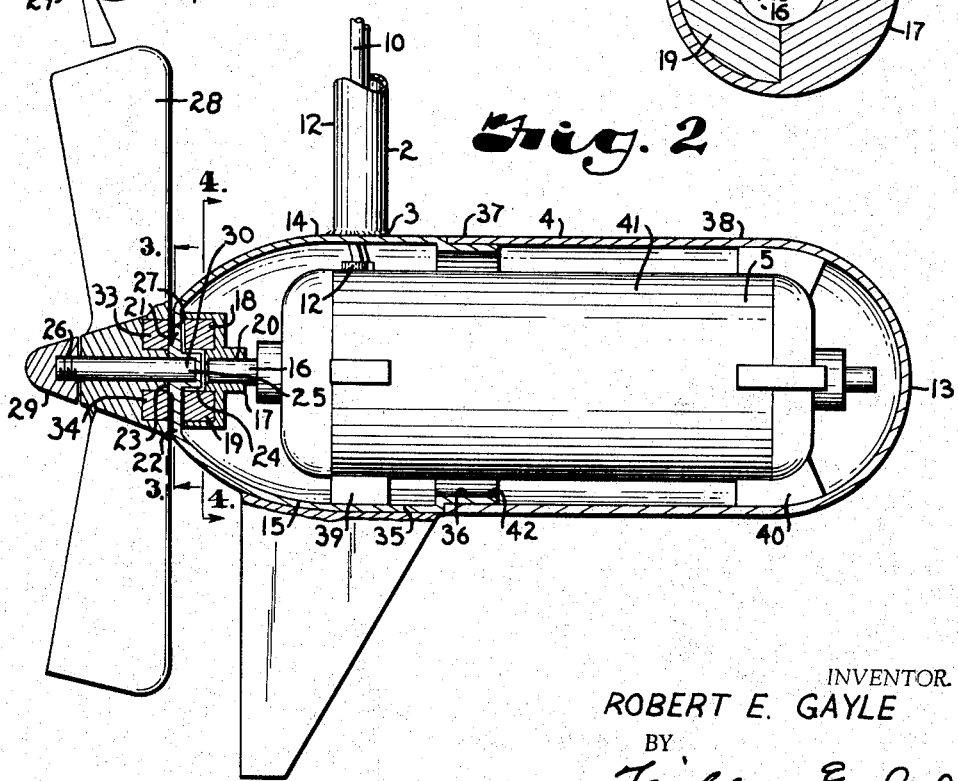
INVENTOR.
ROBERT E. GAYLE
BY
*Fishburn & Gold.*
ATTORNEYS

United States Patent Office 3,361,215
Patented Jan. 2, 1968

3,361,215
MAGNETIC DRIVING APPARATUS FOR ELECTRIC FISHING MOTORS
Robert E. Gayle, Shawnee Mission, Kans. (1800 Central, Kansas City, Mo. 64105)
Filed Oct. 17, 1966, Ser. No. 587,264
1 Claim. (Cl. 170—135.75)

ABSTRACT OF THE DISCLOSURE

An electric motor having a rearwardly directed shaft with a magnet thereon is encased in a sealed housing having integral front and rear wall portions covering the forward and rear portions of the motor. A stub shaft is fixed on the rear end of the rear integral housing wall and extends rearwardly. A propeller carrying hub rotates on the shaft and includes a magnet cooperating through the wall with the motor shaft magnet whereby the propeller is driven by the motor.

---

The present invention relates to a novel and improved water propulsion unit utilizing complemental magnets to achieve the desired results.

The propulsion unit particularly concerned here is an electric motor for attachment to a boat or the like, sometimes referred to as electric fishing motors, and the type heretofore in use have had a serious drawback in that it has been found that most of them will leak through the housing and particularly around the shaft extending through the housing and upon which the propeller is mounted.

The principal object of the present invention is to provide magnets for rotating the propeller of the motor to propel the boat to which the motor is attached, and wherein there will be no opening in the housing of the motor for mounting of the propeller on the shaft, as has been heretofore practiced.

Other objects of the present invention are: to provide a housing for a motor having a shaft upon which a magnet is mounted to rotate with the shaft inside the housing; to provide an electric outlet to the motor to a source of supply such as a battery; to provide a housing having a rounded rear portion and tapered inwardly toward the magnet portion on the front end and a portion across the front having a plane surface and an increased thickness; to provide the thickened end portion with a socket for mounting a shaft therein; to provide a propeller for mounting on the shaft; to provide the hub of the propeller with a magnet facing the magnet in the housing; and to provide means for mounting the propeller on the shaft.

Still further objects of the present invention are: to provide a tubular standard rigidly mounted to the housing of the motor and through which the electric wiring is run; to provide means connected to the standard for attaching the standard to a boat or the like; and to provide a device of this character simple and economical to manufacture.

Other objects and advantages of this invention will become apparent from the following description taken in connection with the accompanying drawings, wherein are set forth by way of illustration and example, certain embodiments of this invention.

FIG. 1 is a fragmentary perspective view of a boat and a motor and attaching means to a boat.

FIG. 2 is an enlarged longitudinal cross-sectional view through the housing for the motor, and particularly illustrating the mounting of the magnets.

FIG. 3 is a cross-sectional view taken on line 3—3, FIG. 2.

FIG. 4 is a cross-sectional view taken on line 4—4, FIG. 2.

Referring more in detail to the drawings:

The reference numeral 1 designates a structure embodying the features of my invention, including a tubular standard 2 rigidly secured by welding or the like 3 to a housing 4 for a motor 5. The tubular standard 2 is secured to a boat 6 or the like by clamping mechanism 7 and the standard extends upwardly above the boat, forming a mechanism as indicated at 8, including a switch 9, and conductors 10 to a battery (not shown). The conductors extend through the box 11 and the tubular standard 2 to connect with the motor as indicated at 12.

The motor 5 acts as a prime mover for the water propulsion unit operatively mounted for employment beneath the surface of the water, and the motor being disposed within the water-tight housing 4. The housing is illustrated as generally cylindrical, having a pair of opposed ends, the forward end 13 being rounded and the rear end having sides tapered inwardly toward each other, as indicated at 14 and 15. The motor 5 has a shaft 16 upon which is mounted a carrier member 17 for spaced apart magnets 18 and 19. The carrier 17 on the shaft 16 includes a socket 20 and is press-fitted on the shaft 16 or secured thereon by other suitable means.

The rear end 21 of the housing 4 has a plane surface 22 and offset outwardly as indicated at 23, and also extends inwardly, forming a hub 24 having a socket 25 for receiving a shaft 26 for mounting the hub portion 27 of a propeller 28. The shaft 26 is threaded and a nut 29 is provided for engaging the threads to retain the propeller on the shaft. The inward end 30 of the shaft 26 may be press-fitted into the socket 25 or may be secured therein by other suitable means.

The hub 27 of the propeller is recessed in its face, facing the end 21 of the housing 4, as indicated at 31 and 32, and secured therein are spaced magnets 33 and 34.

The housing 4 may be of any non-magnetic material, such as aluminum, plastic or the like, and the carrier 17 and hub portion 24 of the propeller are also of non-magnetic or non-ferrous material. The shaft or pin 26 may be of brass.

It will be obvious that the magnets 18 and 19 are the permanent or primary magnets secured to the shaft of the motor and rotatable therewith, and the magnets 33 and 34 are the secondary magnets. It is further obvious that the magnetic forces from the primary rotating magnets 18 and 19 attract and spin the secondary magnets 33 and 34, so that the latter will follow rotation of the primary magnets.

The primary magnets have been designated as to north and south poles and they will attract the same poles on the secondary magnet as like poles propel and unlike poles retract.

The housing 4 is in two pieces, and the forward portion 35 is slightly offset inwardly, as indicated at 36, and the end 37 of the rear portion 38 of the housing telescopes thereover and is fit tightly thereon, to make a water-tight connection.

In assembling the device, the motor with the primary magnet on the shaft is inserted in the portion 35 of the housing and secured therein by the flange 39 and to the rear portion 38 of the housing, by flanges 40. The body 41 of the motor 5 is also secured to the inset portion of the housing 36 by a flange member 42, so that if any moisture leaks at the connection of the two bodies of the housing, it would be retained in the rear portion and would not effect the primary magnets.

It will be obvious from the foregoing that I have provided an improved magnetically operated propeller for an electric motor for propelling a boat, wherein no moisture or water will enter the housing for the motor.

It is to be understood that while I have illustrated and described certain forms of my invention, it is not to be limited to the specific forms or arrangement of parts herein described and shown except insofar as such limitations are included in the claim.

What I claim and desire to secure by Letters Patent is:

1. A magnetically operated sealed marine propulsion unit of the character described comprising:
   (a) a normally submerged cylindrical housing having an integral rear wall extending forwardly to approximately the midsection thereof and an integral forward wall extending from said midsection to the front of said housing, said housing walls being sealed together at said mid-section, said housing walls closing the ends of said housing, the rear end of said housing having a thickened portion,
   (b) a motor mounted in said housing and having a rearwardly extending shaft, a primary magnet mounted on said motor shaft,
   (c) a stub shaft, a depressed socket in said thickened portion and rigidly receiving one end of said stub shaft with the other end projecting rearwardly of said housing,
   (d) a propeller having a hub portion rotatably mounted on said stub shaft, a hub retainer on the free end of said shaft, and a secondary magnet mounted in said hub portion and facing said primary magnet whereby operation of said motor will rotate said primary magnet and thereby cause the secondary magnet to rotate said propeller.

References Cited

UNITED STATES PATENTS

| | | | |
|---|---|---|---|
| 2,729,962 | 1/1956 | Hicklin | 103—87 |
| 3,085,407 | 4/1963 | Tomlinson | 192—84 X |

FOREIGN PATENTS

| | | |
|---|---|---|
| 607,402 | 10/1960 | Canada. |
| 945,183 | 7/1956 | Germany. |
| 648,950 | 1/1951 | Great Britain. |

EVERETTE A. POWELL, JR., *Primary Examiner.*